May 1, 1962   F. W. FENTON   3,031,701
MECHANICAL DOCKBOARD
Filed Nov. 3, 1958   3 Sheets-Sheet 1

INVENTOR.
FRANK W. FENTON
BY Ralph W. Kalish
ATTORNEY

INVENTOR.
FRANK W. FENTON
BY
ATTORNEY

May 1, 1962 F. W. FENTON 3,031,701
MECHANICAL DOCKBOARD
Filed Nov. 3, 1958 3 Sheets-Sheet 3

*INVENTOR.*
FRANK W. FENTON
BY

ATTORNEY

United States Patent Office 3,031,701
Patented May 1, 1962

3,031,701
MECHANICAL DOCKBOARD
Frank W. Fenton, Lemay, Mo., assignor, by mesne assignments, to Beacon Machinery, Inc., St. Louis County, Mo., a corporation of Missouri
Filed Nov. 3, 1958, Ser. No. 771,586
4 Claims. (Cl. 14—71)

This invention relates in general to material handling equipment and, more particularly, to a mechanically operated dockboard for use with platforms.

It is an object of the present invention to provide a dockboard for utilization with the customary shipping and receiving platforms of industrial concerns and the like which is designed for mechanical operation and, hence, is not subject to the rather frequent and costly breakdowns occurring in hydraulically, pneumatically, or electronically operated dockboards.

It is a further object of the present invention to provide a mechanically operated dockboard wherein the actuating force is provided by the vehicle approaching the loading platform for loading or unloading operation.

It is a further object of the present invention to provide a mechanically operated dockboard having a unique balancing system so that in swinging movement of the incorporated ramp plate no forceful impacts or jarring actions are developed thereby preventing damage to any components of the dockboard.

It is a further object of the present invention to provide a mechanically operated dockboard having a simplicity of parts conducive to the facile, effective, and reliable operation of the dockboard; which may be economically manufactured; and which is durable in usage.

Other objects and details of the invention will be apparent from the following description, when read in connection with accompanying drawings (3 sheets) wherein.

Figure 1:
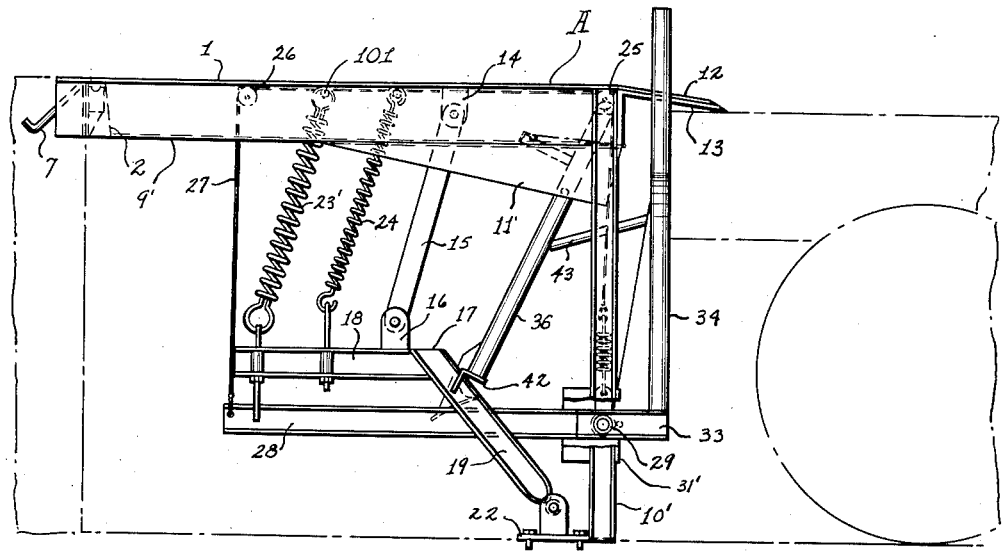
FIGURE 1 is a side view of a dockboard constructed in accordance with and embodying the present invention, illustrating the ramp plate in resting, operative position upon the bed of a vehicle.
Figure 2:
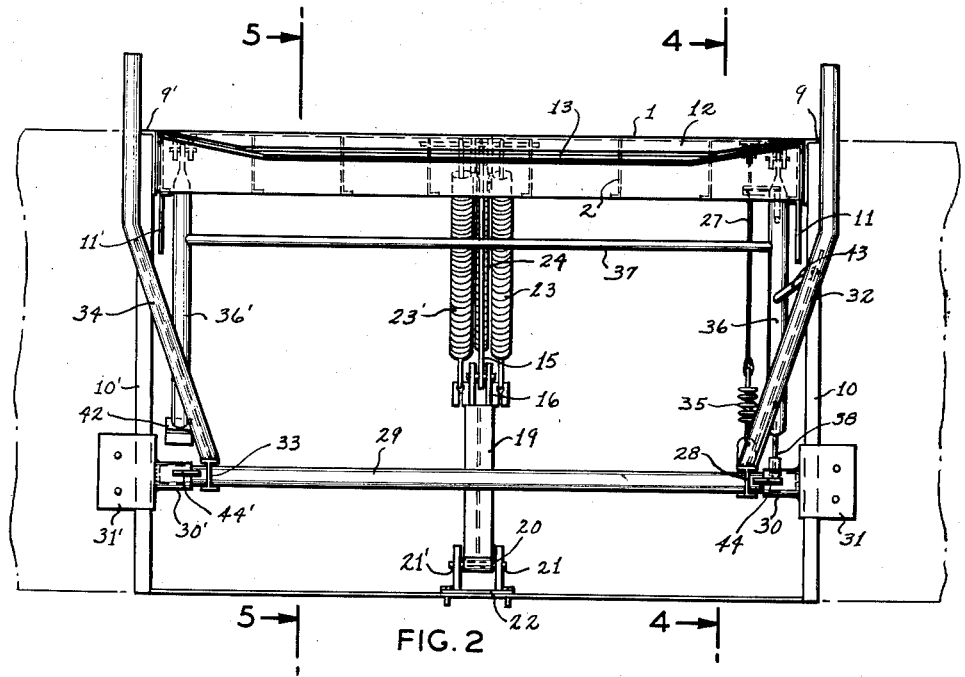
FIGURE 2 is a front view of the dockboard as shown in FIGURE 1.
Figure 3:
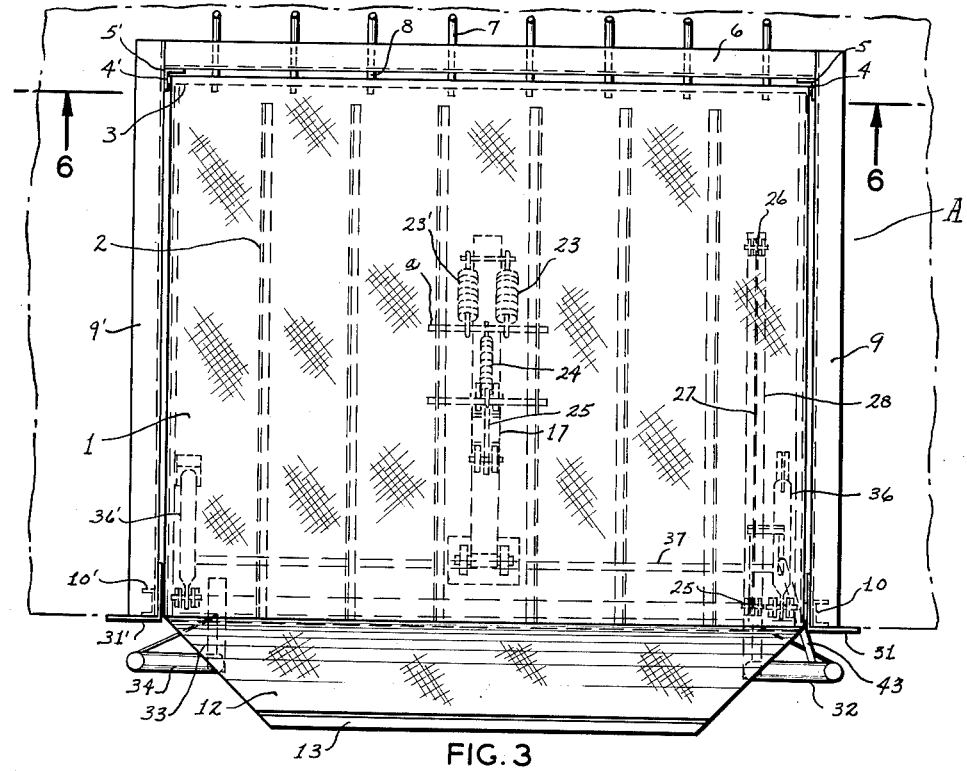
FIGURE 3 is a top plan view.
Figure 6:
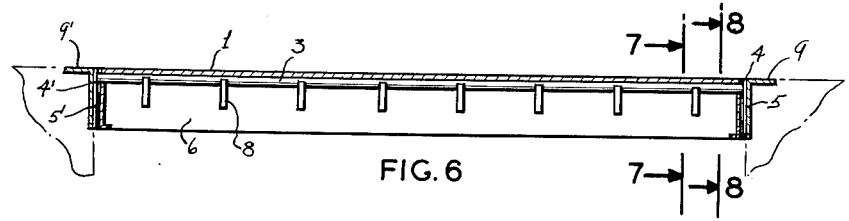
FIGURE 6 is a vertical transverse section taken on the line 6—6 of FIGURE 3.
Figure 7:
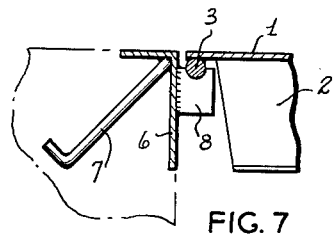
FIGURE 7 is a vertical transverse section taken on the line 7—7 of FIGURE 6.
Figure 8:
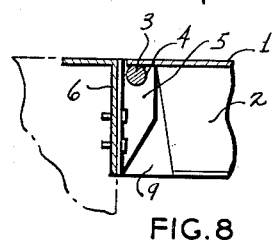
FIGURE 8 is a vertical transverse section taken on the line 8—8 of FIGURE 6.

Referring now by reference characters to the drawings which illustrate the preferred embodiment of the present invention, A designates generally a dockboard which may be optionally mounted upon a conventional supporting framework (not shown) for disposition adjacent a pre-existing loading dock or platform, or may be installed within a specially prepared recess or pit within such platform. For purposes of illustration only, the dockboard of the present invention is hereinbelow described as being mounted within a specially prepared pit having concrete side portions.

Said dockboard A comprises a ramp plate 1 for forming a roll-over surface, being fabricated of heavy gauge stock and being reinforced by a plurality of spaced apart, parallel ribs or angle members 2 extending longitudinally of plate 1 and welded, or otherwise fixed, to the under surface thereof. Said ribs 2 terminate at their rearward end spacedly from the rearward edge portion of plate 1 to the under-face of which is secured a transversely extending hinge rod 3. At its ends, said hinge rod 3 is journaled in bearings 4, 4' provided in hinge brackets 5, 5', respectively, which are secured to opposite end portions of a rear curb angle 6 having spaced anchor rods 7 set into the concrete loading dock at the rear edge of dockboard A. Between hinge brackets 5, 5', there are provided a plurality of spaced, upwardly opening, hinge rod bearings 8 welded to the vertical section of curb angle 6. Thus, by means of hinge rod 3 and its associated structure, plate 1 is adapted for vertical swingable movement about its rearward edge portion. The loading platform may be provided with lateral curb angles 9, 9' for reinforcing the horizontal concrete edges of the prepared pit, and there may be further provided vertical frame members 10, 10', preferably of angle stock, at the vertical front edges of the pit. Safety skirts 11, 11' are disposed at the side of plate 1 being fixed to the adjacent outer ribs 2. At its forward end plate 1 is turned downwardly in the formation of a lip 12 for disposition upon the bed of a vehicle disposed adjacent to the dock for loading or unloading operations; said lip 12 being supported by an angulated member 13 having one portion welded to the under surface of lip 12 and projecting outwardly there-beyond and another portion extending transversely of plate 1 and being fixed to the forward end edges of ribs 2.

Pivotally engaged, as by a clevis 14, to the under surface of plate 1, substantially along its longitudinal center line and forwardly of its transverse median, is the upper end of a link or upper lift arm 15, the lower end of which is swingably mounted, as by a clevis 16, upon a lower lift arm 17; which latter comprises a rearward, substantially horizontal section 18 and a forward section 19 inclining downwardly and forwardly from section 18. At its lower, forward end, lift arm 17 is secured to a short rock shaft 20 journaled at its ends in spaced bearings 21, 21' presented upon a plate 22 suitably secured upon the base of the pit or support surface, as the case may be.

Engaged upon lift arm horizontal section 18, adjacent its rearward end, are the lower ends of a pair of axially parallel, relatively strong coil springs 23, 23', in side-by-side relation, the upper ends of which are secured to the under surface of plate 1, on opposite sides of the longitudinal center line thereof, as by a short pin 10' extending between adjacent ribs 2. Between springs 23, 23' and link 15 is a single coil spring 24 of relatively reduced strength with respect to springs 23, 23', being axially parallel to link 15 and connected at its end to horizontal section 18 and the under surface of plate 1. Springs 23, 23' are so designed as to counter balance ramp plate 1 and to bias the same into upwardly swung position as shown in phantom lines in FIGURE 5, but the upward urging force of such springs exceeds by a limited degree the gravitational force of plate 1 so that depression of plate 1 may be accomplished by relatively small effort.

Figure 4:
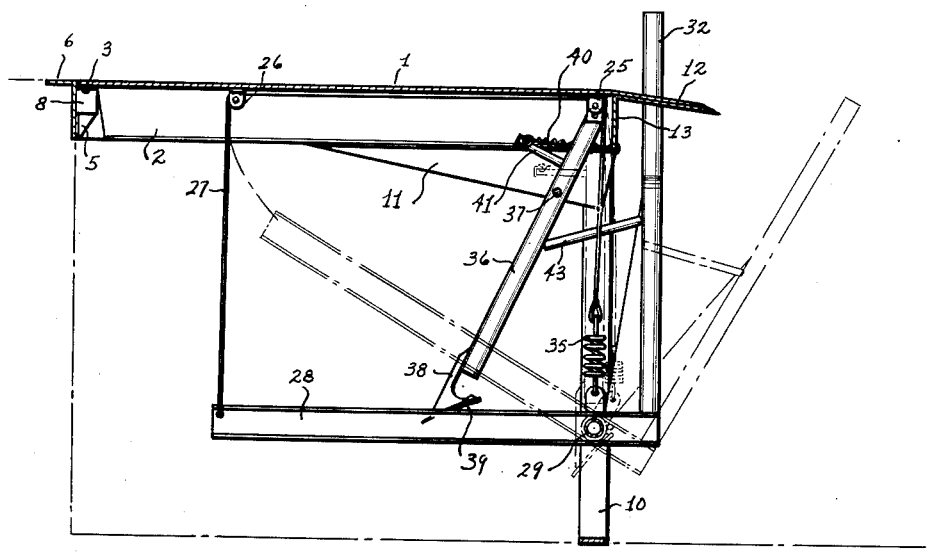
FIGURE 4 is a vertical transverse section taken on the line 4—4 of FIGURE 2, showing the locking system in locked engagement in phantom lines.

Mounted on the under surface of plate 1 toward one side thereof is a pair of longitudinally spaced, aligned pulleys 25, 26' about which is trained a cable 27. The rearward end of cable 27 is led downwardly of pulley 26 for securement to the rearward end of an elongated lever arm 28, formed of channel stock, of a dockboard actuating assembly; said lever arm 28 being in its forward portion fixed upon a torque bar 29 located downwardly of the forward end portion of plate 1 and extending transversely between the lower ends of vertical frame members 10, 10', being journaled at its ends in socket-like bearings 30, 30' carried on hinge plates 31, 31', respectively, secured to the sides of the pit, as by bolts, and in covering relation to the proximate portions of the adjacent frame members 10, 10', respectively. Lever arm 28 extends a short distance forwardly of torque bar 29 and mounts on its forward end an upwardly projecting operating arm 32, the upper end of which will extend above plate 1 when lever arm 28 is in downwardly rocked condition in its rearward portion (FIGURE 4). On its end, adjacent bearing 30', torque bar 29 carries a short channel section 33 parallel to lever arm 28 for swinging movement responsive to rotation of torque bar 29; said section 33 supports in its forward end an operating arm 34, being symmetrical with, and structurally corresponding to, operating arm 32. Both operating arms 32, 34 incline laterally outwardly in their lower portions for presenting their upper sections spacedly from the sides of lip 12 to present full access therebetween to plate 1.

Engaged upon lever arm 28 immediately above torque bar 29 is the lower end of a coil spring 35 the upper end of which is secured to the forward end of cable 27.

Figure 5:
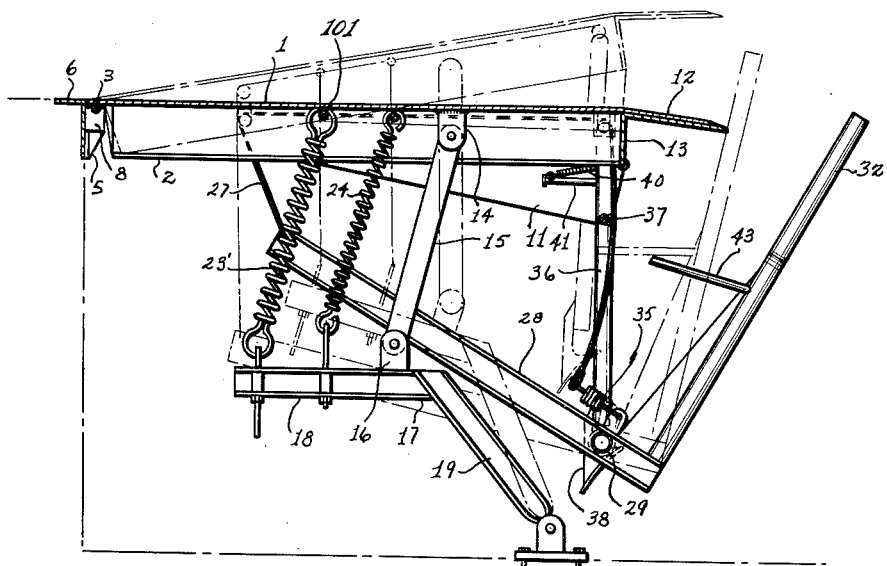
FIGURE 5 is a vertical transverse section taken substantially on the line 5—5 of FIGURE 2, showing the ramp plate in upward condition in phantom lines.

Lever arm 28 together with the associated structure comprising the dockboard actuating assembly, is biased gravitationally into the position shown in full lines in FIGURE 5 wherein said arm 28 is downwardly rocked in its forward end with the upper ends of operating arms 32, 34 being presented at their maximum distance from dock A for early contact with a vehicle being backed toward said dock.

It will thus be seen that as lever arm 28 is swung downwardly at its rearward end consequent to rotative movement of torque bar 29 responsive to operating arms 32, 34 being swung toward dock A by force applied thereon by the backing vehicle, the rearward end of cable 27 will be pulled downwardly thereby causing plate 1 to be swung downwardly at its forward end with development of loading of coil spring 35 (see FIGURE 4), whereby the normal upward bias of plate 1 under counter balancing springs 23, 23', 24 is overcome. Of especial importance is the fact that the downward rocking of plate 1 as effected by operation of the dockboard actuating assembly will be smooth and plate 1 will be readily maintained at any intermediate position between full up and full down under the delicate balancing between the counterbalancing system and the actuating assembly.

As indicated above, operating arms 32, 34 are presented for contactive engagement by the rearward portions of a vehicle being backed toward loading dock A for disposition relative thereto for operational purposes. Thus, the vehicle in backing after engaging arms 32, 34 will continue to apply force for motivating the actuating assembly until the forward or lip-bearing end 12 of ramp plate 1 rests upon the bed of the vehicle and thereby provides a bridge between same and dock A. Should the vehicle inadvertently continue to apply pressure upon the actuating assembly after ramp plate 1 is disposed upon the truck bed, no inadvertent damage will be caused the actuating assembly since spring 35 would compensate for any strain placed upon the assembly.

Upon withdrawal of the vehicle from the loading dock, the actuating assembly would be permitted to be rocked retainingly with lever arm 28 swinging upwardly at its rearward end, under the release of tension upon spring 35 whereby cable 27 is pulled forwardly with ramp plate 1 being thus restored to influence of springs 23, 23', 24, and thereby allowed to swing upwardly commensurately with the rocking of the actuating assembly to inoperative condition. As stated above, the movement of plate 1 between full-up position and resting engagement upon the vehicle bed will be smooth and even, without any jarring or damaging impacts, so that undesirable stresses and strains will not be occasioned any elements of dockboard A.

Provided with dockboard A is a locking system whereby ramp plate 1 may be securely maintained in level position, that is, aligned planarwise with the surface of the loading platform to allow facile travel thereacross of traffic moving along the platform. Said system incorporates an H-frame comprised of a pair of horizontally spaced, parallel, vertical side bars 36, 36' hingedly mounted at their upper ends, as by clevises, to the under surface of plate 1 adjacent the forward side portions thereof; there being a transverse brace 37 extending between, and secured rigidly at its ends, to, said bars 36, 36'. Bar 36 carries at its lower ends a latch arm 38 for locking engagement with socket bearing 30, and downwardly of said arm 38 is provided a shoe or an arcuate cam-forming member 39 for camming action with bearing 30 in a manner to be described hereinbelow. Said H-frame is urged into forwardly rocked, or substantially vertical position, in planar normal relationship to plate 1, by means of a spring 40 secured at one end to the transverse portion of member 13 and at its other end to a support 41 rigid on bar 36 near the upper end thereof. Bar 36' is provided at its lower or free end with an angle-shaped detent 42 for abutment against socket bearing 30'.

For operative engagement, at its rearward free end, with bar 36, is a pusher or unlocking arm 43 welded at its forward end to the adjacent operating arm 32 and extending rearwardly therefrom. As operating arm 32 is swung rearwardly under force of the backing vehicle, pusher arm 43 will be brought into contact with bar 36 causing same to be rocked rearwardly and thereby lose locked engagement with socket bearing 30 and thus the H-frame will be pivoted rearwardly as the dock actuating assembly is swung by the vehicle-applied force.

With ramp plate 1 in upwardly swung position, as shown in phantom lines in FIGURE 5, latch arm 38 with shoe 39 will be disposed spacedly upwardly of torque bar 29, with the locking system thus in unlocked condition. By the application of downwardly directed pressure, in the order of only about 80 pounds, upon the forward end of plate 1, the latter will be easily depressed overcoming the counterbalancing springs, causing the arcuated surface of shoe 39 to be brought into engagement with socket bearing 30 and to be moved relatively downwardly therealong as plate 1 is lowered. Due to the curvature of shoe 39 latch arm 38 will be simultaneously moved relatively rearwardly of socket bearing 30, with attendant commensurate swinging of the H-frame, placing spring 40 under tension, so that as engagement is lost between shoe 39 and socket bearing 30 on continued downward rocking of plate 1, latch arm 38 will be disposed for locking engagement with said bearing 30, and under the force of the now-released spring 40 will be swung forwardly into locking relationship (FIGURE 5), in which position detent 42 will engage socket bearing 30'. Therefore, with the H-frame of the locking system in latched condition, plate 1 will be maintained in horizontal or platform-aligning position. Latch arm 38 may be easily disengaged by the action of pusher arm 43 against bar 36 as the dock-approaching vehicle causes operating arm 32 to be swung rearwardly, since bar 36 will be forced rearwardly pulling latch arm 38 away from locked relation, wherein plate 1 will swing upwardly under spring bias.

Fixed upon the exterior wall of each socket bearing 30, 30' is an axially extending abutment finger 44, 44' respectively, which projects beyond the outer end of the related bearing for stop-wise engagement with the upper flange of lever arm 28 and section 33, respectively, for limiting the movement of the same into forwardly rocked position.

Thus, in view of the foregoing, it will be seen that dockboard A is entirely mechanically operated and so counterbalanced that the movements thereof are easily controlled; and that the motivating force for the operation thereof is supplied completely by an extraneous agency, namely, a vehicle backing toward the loading platform. Therefore, dockboard A, having a simplicity of parts, can be most economically manufactured and will not be subject to frequent breakdown, with costly "down" time as is encountered with current dockboards having hydraulic, pneumatic, or electronic operating means.

It should be understood that changes and modifications in the formation, construction, arrangement, and combination of the several parts of the mechanical dockboard may be made and substituted for these herein shown and described without departing from the nature and principle of my invention.

Having thus described my invention, what I claim and desire to secure by Letters Patent is:

1. A dockboard comprising a support structure, a plate pivotally mounted at its rearward edge portion on said support structure in its upper rearward portion for swingable movement about a horizontal axis, spring means engaged to the undersurface of said plate for biasing same into upwardly inclined position above the support structure, opposed portions of said frame beneath the forward end of said plate having aligned journal bearings, a transverse member presented beneath said plate and being journalled at its ends in said bearings, a locking arm swingably mounted at its upper end to the undersurface of said plate and depending therefrom, a latch-defining recess provided at the lower end portion of said locking arm for engagingly receiving one of said bearings whereby said plate will be maintained fixedly in horizontal disposition, resilient means biasing said locking arm forwardly into latched relation with the associated bearing, a support member rockably mounted on said transverse member in axial normal relationship thereto and extending rearwardly and forwardly thereof, a vehicle-engaging, operating arm carried on the forward end of said support member, for movement rearwardly under applied force to effect downward swinging of said support member in its rearward portion for consequent depression of said plate against the bias of said spring means, a cable operatively engaged to said plate and being connected at its ends to said support member in the latter's rearward portion and proximate its area of engagement to said operating arm and means provided on said operating arm for engaging said locking arm for driving same rearwardly into unlatched relation as said operating arm is moved rearwardly.

2. A dockboard as described in claim 1 wherein said locking arm carries at its lower end, downwardly of said latch-defining recess, a cam-forming element for coaction with said bearing as said plate is lowered to present said latch-defining recess for engagement therewith.

3. A dockboard comprising a support structure, a plate pivotally mounted at its rearward edge portion on said support structure in its upper rearward portion for swingable movement about a horizontal axis, spring means engaged to the undersurface of said plate for biasing same into upwardly inclined position above the support structure, a transverse member presented beneath said plate and extending between, and being journalled at its ends in opposed portions of said frame, an H-shaped frame having a pair of parallel first and second vertical elements and an interconnecting transverse member, said H-frame being hingedly mounted at its upper end to the undersurface of said plate and depending therefrom, being free at its lower end, resilient means urging said H-frame forwardly into vertical relationship axially perpendicular to said transverse member, a latch-defining recess provided in the lower end portion of one of said vertical elements for locking engagement with said transverse member, a vehicle-engaging operating arm pivotally mounted on said support structure for rockable movement with respect to said transverse member, and a pusher arm carried on said operating arm for engaging said H-frame as said operating arm is rocked in one direction for swinging said H-frame into unlocked condition.

4. A dock board as described in claim 3 wherein a cam is mounted below said latch member for coaction with said transverse member in effecting locking engagement between same and said latch member, and wherein such other vertical element mounts a detent in its lower portion for abutment against said transverse member.

References Cited in the file of this patent

UNITED STATES PATENTS

| | | |
|---|---|---|
| 1,091,835 | Goss | Mar. 31, 1914 |
| 1,112,543 | Love | Oct. 6, 1914 |
| 2,639,450 | Ramer | May 26, 1953 |
| 2,714,735 | Watson | Aug. 9, 1955 |
| 2,751,615 | Kelly | June 26, 1956 |

FOREIGN PATENTS

| | | |
|---|---|---|
| 726,124 | Great Britain | Mar. 16, 1955 |